(12) United States Patent
Schneider

(10) Patent No.: US 7,374,218 B2
(45) Date of Patent: May 20, 2008

(54) SLIDE-OUT MEMBER WITH EMBEDDED GEAR RACK FOR USE IN SLIDE-OUT ROOM MECHANISMS

(75) Inventor: Robert Schneider, Beaver Dam, WI (US)

(73) Assignee: Lippert Components, Inc., Goshen, IN (US)

( * ) Notice: Subject to any disclaimer, the term of this patent is extended or adjusted under 35 U.S.C. 154(b) by 259 days.

(21) Appl. No.: 11/088,227

(22) Filed: Mar. 23, 2005

(65) Prior Publication Data

US 2005/0225109 A1 Oct. 13, 2005

Related U.S. Application Data

(60) Provisional application No. 60/555,544, filed on Mar. 23, 2004.

(51) Int. Cl.
*B60P 3/34* (2006.01)
(52) U.S. Cl. .................. 296/26.01; 296/26.13; 296/175; 52/67
(58) Field of Classification Search ............. 296/26.01, 296/26.03, 26.08, 26.09, 26.12, 26.13, 165, 296/170–173, 175, 176; 49/64, 67
See application file for complete search history.

(56) References Cited

U.S. PATENT DOCUMENTS

| | | | | |
|---|---|---|---|---|
| 5,706,612 A * | 1/1998 | Tillett | ............................ | 52/67 |
| 5,758,918 A * | 6/1998 | Schneider et al. | ....... | 296/26.13 |
| 5,791,715 A * | 8/1998 | Nebel | ....................... | 296/26.13 |
| 5,833,296 A * | 11/1998 | Schneider | ................ | 296/26.13 |
| 6,109,683 A * | 8/2000 | Schneider | ................... | 296/171 |
| 6,116,671 A * | 9/2000 | Schneider | ................ | 296/26.01 |
| 6,286,883 B1 * | 9/2001 | Schneider et al. | ....... | 296/26.14 |
| 6,293,611 B1 * | 9/2001 | Schneider et al. | .......... | 296/171 |
| 6,338,523 B1 * | 1/2002 | Rasmussen | ................ | 296/175 |
| 6,601,896 B1 * | 8/2003 | Nye et al. | ................. | 296/26.13 |
| 6,685,249 B2 * | 2/2004 | Schneider | ................ | 296/26.01 |
| 6,805,391 B2 * | 10/2004 | Schneider | ................ | 296/26.01 |
| 6,871,897 B1 * | 3/2005 | Snyder | .................... | 296/26.13 |
| 6,896,307 B2 * | 5/2005 | Nye et al. | ................ | 296/26.01 |
| 6,981,728 B2 * | 1/2006 | Rasmussen | ............. | 296/26.01 |
| 7,004,528 B2 * | 2/2006 | Nye et al. | ................ | 296/26.01 |
| 7,052,064 B2 * | 5/2006 | Rasmussen | ............. | 296/26.01 |
| 2002/0084664 A1 * | 7/2002 | McManus et al. | ........ | 296/26.13 |
| 2006/0076798 A1 * | 4/2006 | Kunz | ........................ | 296/175 |

* cited by examiner

*Primary Examiner*—D. Glenn Dayoan
*Assistant Examiner*—Greg Blankenship
(74) *Attorney, Agent, or Firm*—Darby & Darby P.C.

(57) ABSTRACT

A slide-out drive member controllably moves a slide-out section that is associated with a vehicle, such as a recreational vehicle, from a retracted position to an extended position. The slide-out drive member includes an inner driven member with embedded teeth with tips that are preferably substantially flush with a bottom surface of the inner driven member; and an outer member that houses the inner driven member along with a gear mechanism that engages with the teeth in the inner driven member to drive the inner driven member, thereby driving the slide-out section. The present slide-out tube overcomes the deficiencies of conventional slide-out tubes by driving the slide-out section in a smooth, uniform, even manner while providing a low profile.

21 Claims, 6 Drawing Sheets

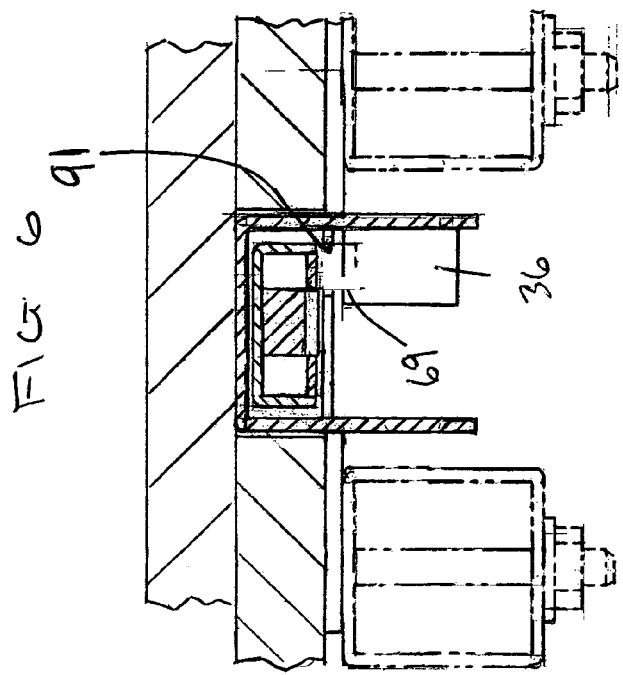
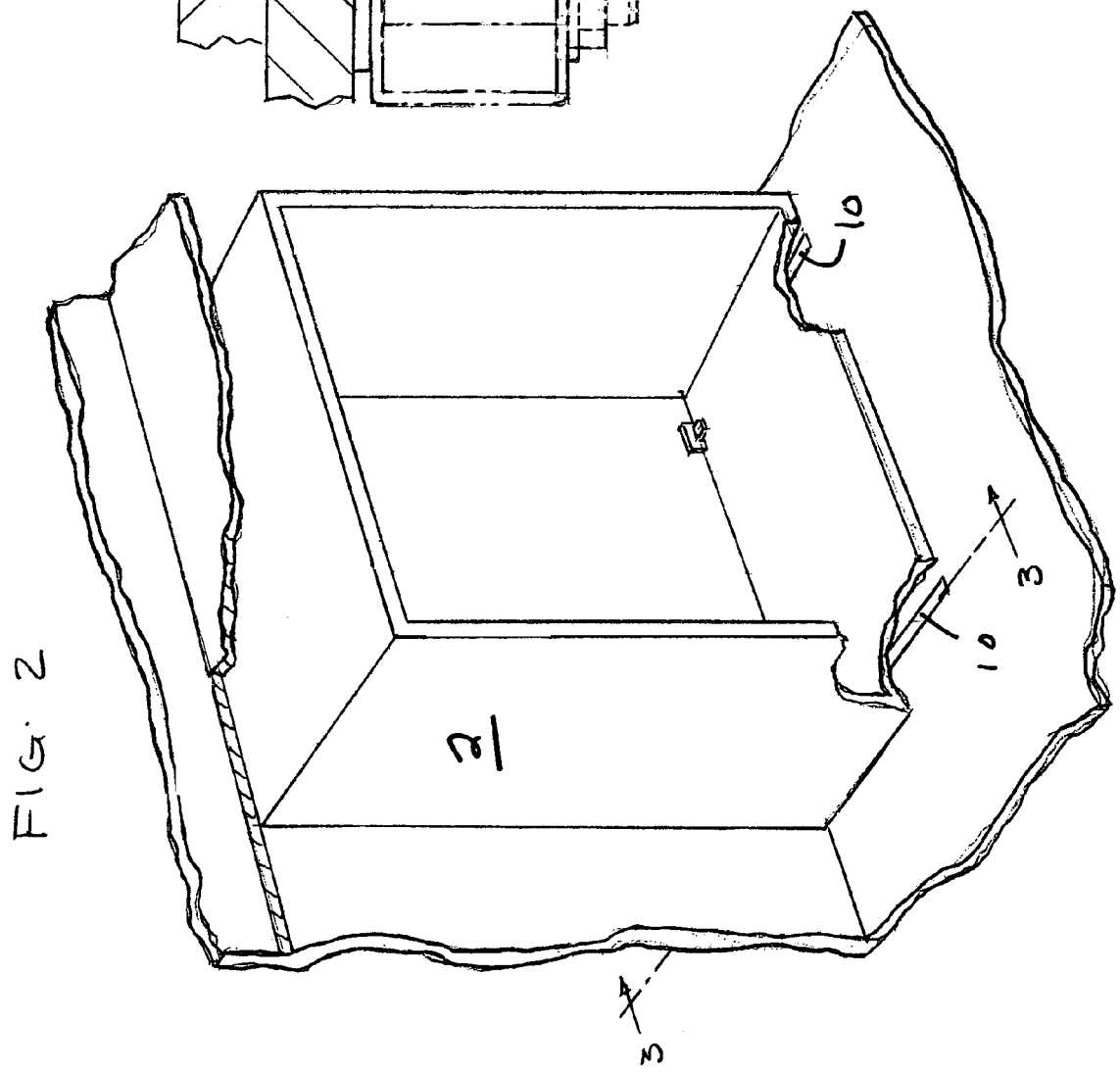

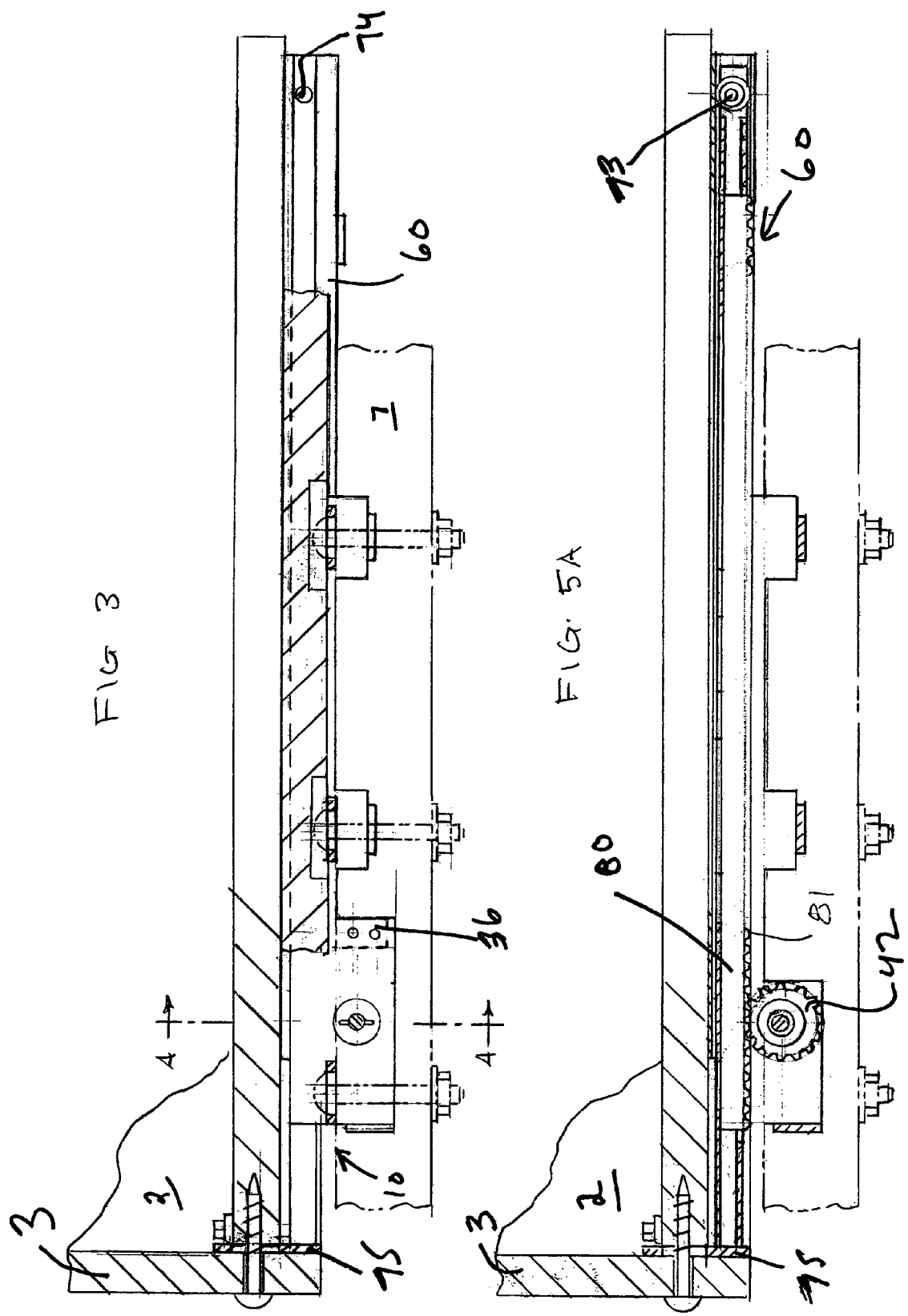

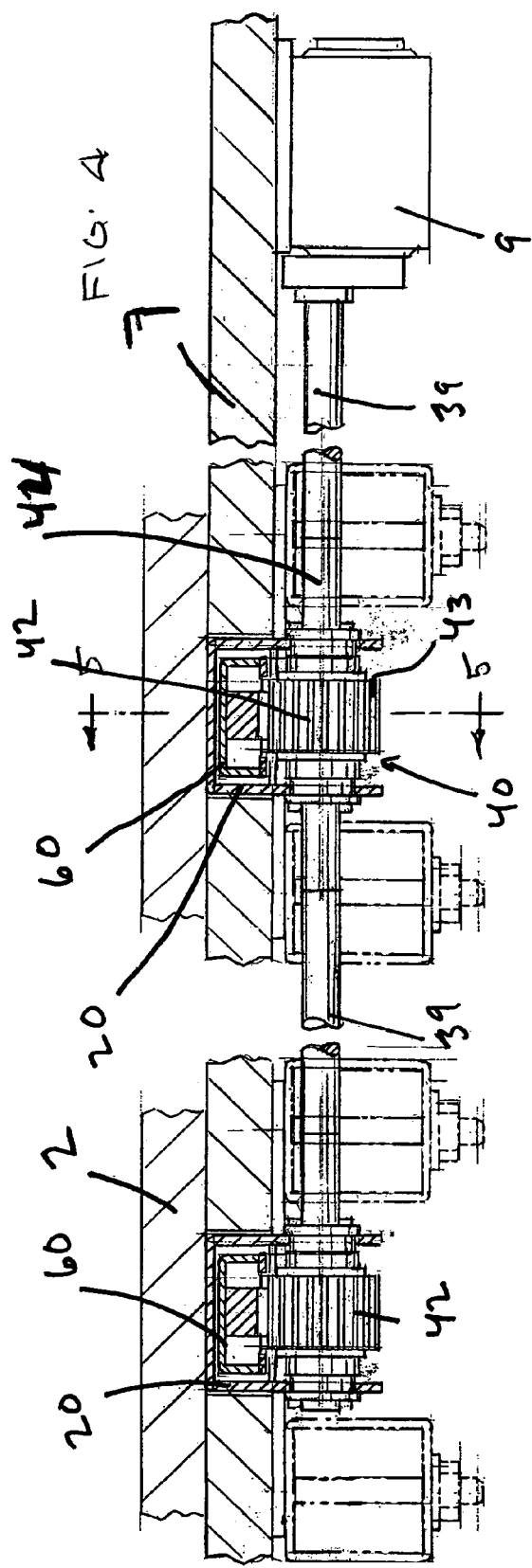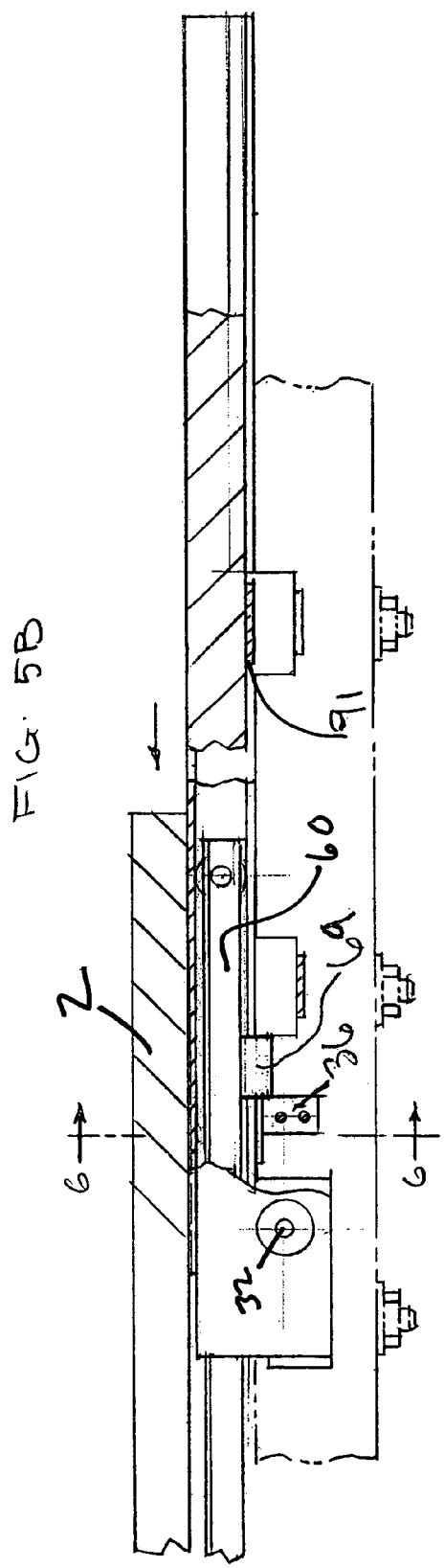

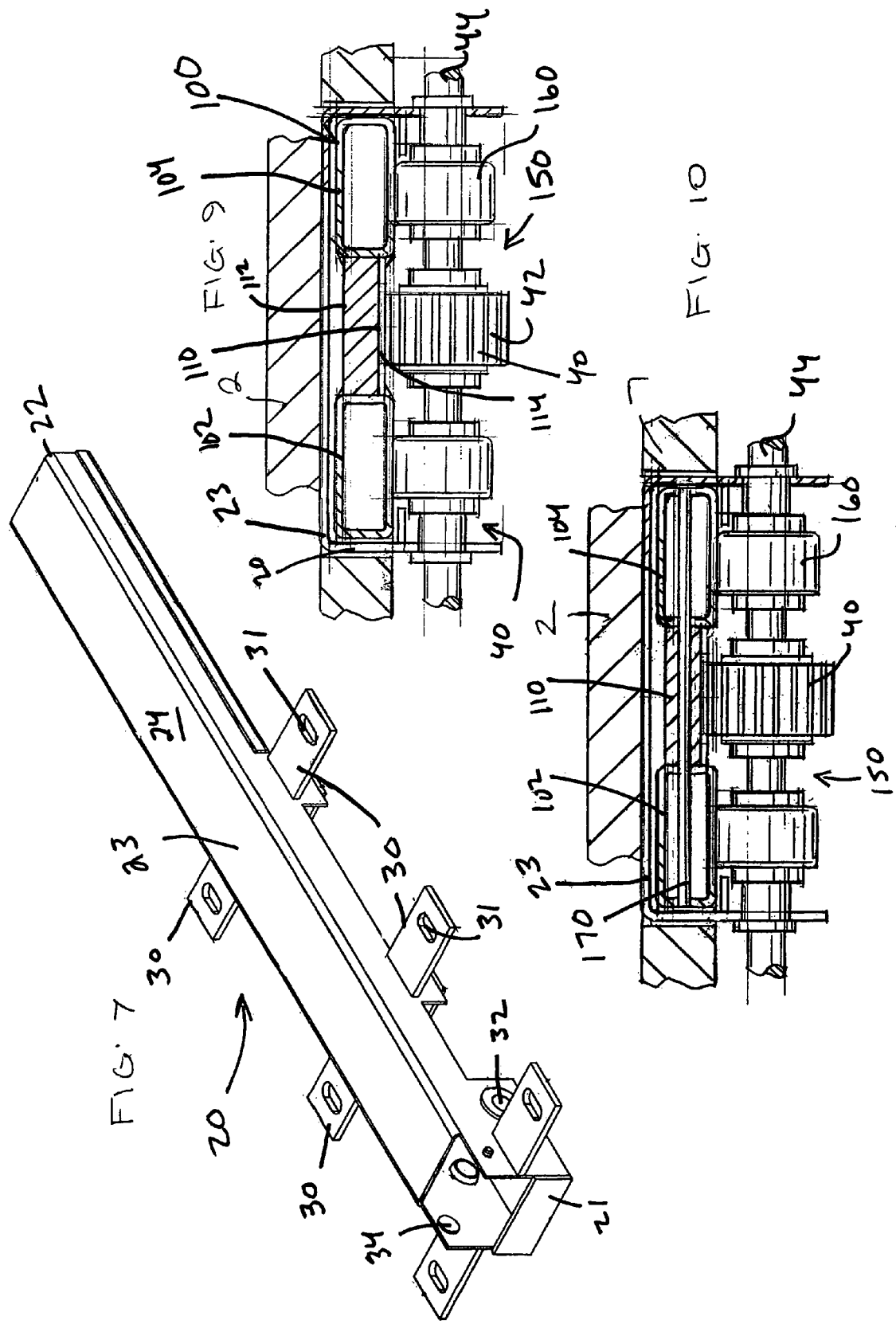

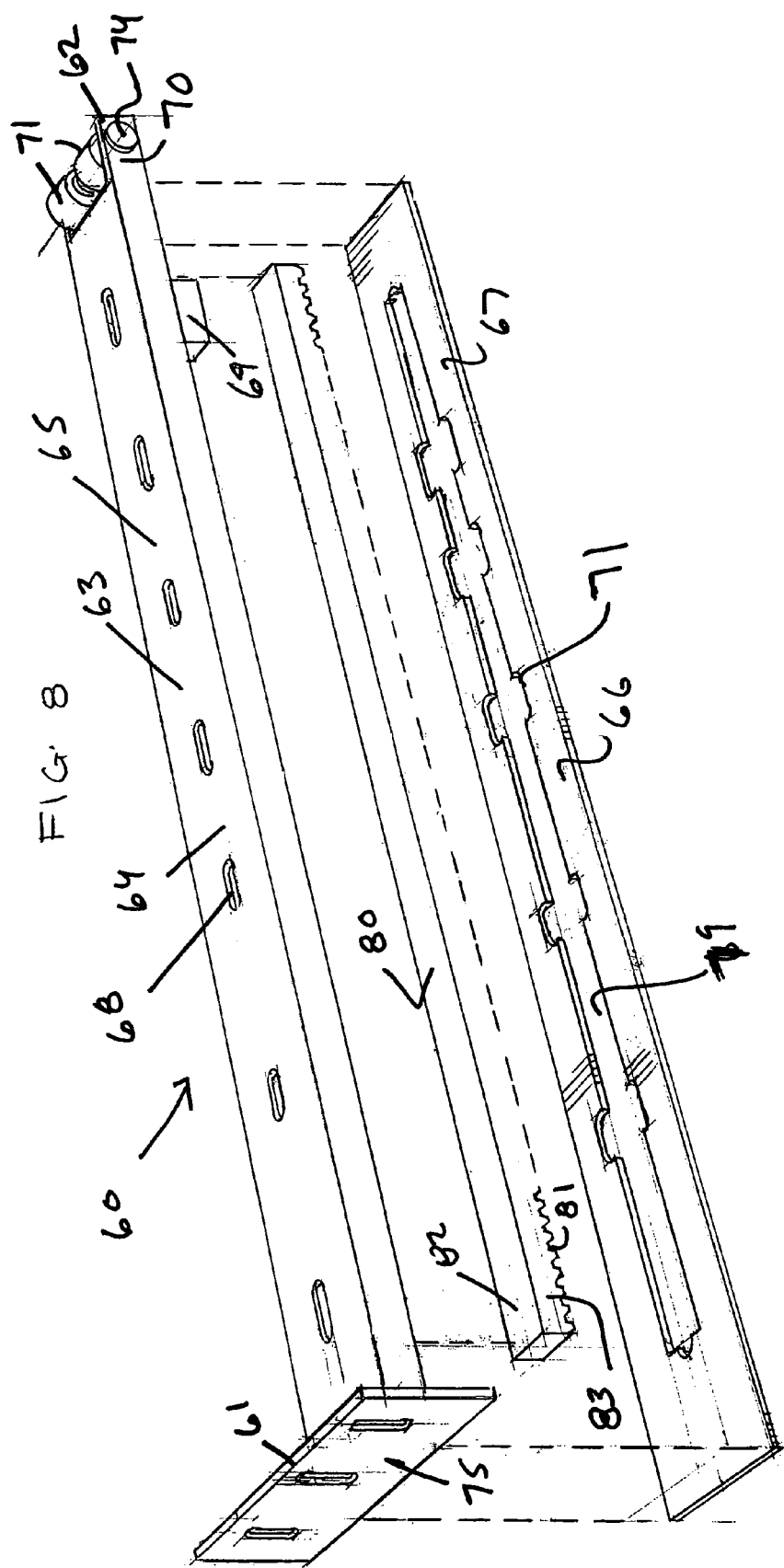

SLIDE-OUT MEMBER WITH EMBEDDED GEAR RACK FOR USE IN SLIDE-OUT ROOM MECHANISMS

CROSS-REFERENCE TO RELATED APPLICATION

The present application claims the benefit of U.S. patent application Ser. No. 60/555,544, filed Mar. 23, 2004, which is hereby incorporated by reference in its entirety.

TECHNICAL FIELD

The present invention relates to a slide-out member, and more particularly, relates to a slide-out member for use in a slide-out mechanism that moves a moveable room section in a controlled manner from a retracted position relative to a main housing of a vehicle to an extended position where the moveable room protrudes beyond the main housing.

BACKGROUND

Conventional recreational vehicles (RV) are available in a number of different types depending upon the size requirements and other desires of the purchaser. For example, the purchaser or user can select an RV that is motorized and can be driven by itself or one can be selected that requires a tow vehicle to tow the RV. Consumers increasingly want additional, increased interior room and also want to be provided with additional options available with the RV. One option that has found increasing commonality in recent years is the incorporation of one or more slide-out sections into the RV. The slide-out sections are part of an automated system where the user simply activates the system resulting in the slide-out section extending outward from an exterior wall of the RV. The slide-out section when placed in its extended position increases the overall available interior space. Slide-out sections can be incorporated into any number of different types of RVs including motor homes and fifth wheel trailer type RVs.

Conventional RVs typically include slide-out mechanisms with one or two arms that are the drive means for driving the slide-out section. The slide-out mechanism is often incorporated above the floor of the vehicle since it is difficult to integrate the slide-out mechanism into the chassis. It is also difficult to integrate the slide-out mechanism into the chassis in a way that maintains a pleasing appearance for the vehicle. As a result, the slide-out mechanism is typically placed in the above the floor location; however, by incorporating the slide-out mechanism above the floor of the upper deck, the amount of available interior space in the upper deck decreases and thus, it is counterproductive to place the mechanism at this location.

One exemplary type of slide-out mechanism incorporated above a floor of the RV is disclosed in U.S. Pat. No. 6,338,523, which discloses a sliding mechanism for extending and retracting a slide-out compartment. The sliding mechanism includes a guide member having two securing flanges separated by a gap that communicates with an interior channel. A slider rail is disposed within the interior channel and has a middle portion adapted with a plurality of holes formed therein. Extending from the middle portion are two securing members that cooperate with the securing flanges of the guide member to maintain the slider rail within the interior channel as the middle portion extends into the gap. Within the interior channel at one end of the guide member, a gear mechanism is provided. The gear member drivingly engages a plurality of teeth on the gear within the plurality of holes in the middle portion of the slider rail.

While the sliding mechanism of the '523 patent is suitable for some uses, it suffers from a number of disadvantages. For example, the sliding mechanism is of the type that while the slider rail slides within the guide member, the sliding mechanism can not be mounted flush to an underside of a support member, such as the floor, since the topmost portion of the sliding mechanism is the sliding rail whose securing members slide along the securing flanges. Thus, only the opposite side of the guide member can be mounted flush against a support member. This limits the locations where the sliding mechanism can be mounted and more importantly, this design does not particularly lend itself to being mounted to an underside of the support member since the topmost sliding rail prevents such an arrangement. It would therefore be desirable to construct a sliding mechanism where the sliding mechanism and the gear mechanism can still be disposed within the channel defined in the guide member; however, the guide member is constructed so that it can be mounted in two ways, either to an underside of a support member or it can be mounted to a topside of the support member.

SUMMARY

A slide-out drive member controllably moves a slide-out section that is associated with a vehicle, such as a recreational vehicle, from a retracted position to an extended position. The slide-out drive member includes an inner driven member with embedded teeth with tips that are preferably substantially flush with a bottom surface of the inner driven member; and an outer member that houses the inner driven member along with a gear mechanism that engages with the teeth in the inner driven member to drive the inner driven member, thereby driving the slide-out section.

The present slide-out member overcomes the deficiencies of conventional slide-out members by driving the slide-out section in a smooth, uniform, even manner while providing a low profile.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which:

FIG. 2 is a perspective view of a slide-out member according to an embodiment of the present invention with the slide-out member being in the retracted position;

FIG. 3 is a cross-sectional view taken along the line 3-3 of FIG. 2 illustrating a slide-out mechanism of FIG. 1;

FIG. 4 is a cross-sectional view of the slide-out mechanism of FIG. 1;

FIG. 5A is a cross-sectional view taken along the line 5-5 of FIG. 4 with the slide-out section being in the retracted position;

FIG. 5B is a cross-sectional view taken along the line 5-5 of FIG. 4 with the slide-out section being in the extended position;

FIG. 6 is a cross-sectional view taken along the 6-6 of FIG. 5;

FIG. 7 is a perspective view of a housing of the slide-out mechanism of FIG. 3;

FIG. 8 is an exploded perspective view of an inner driven member of the slide-out mechanism with gear mechanism;

FIG. 9 is a close-up cross-sectional view of an inner driven member according to a second alternative embodiment with the housing of the slide-out mechanism; and FIG. 10 is a close-up cross-sectional view of an inner driven member according to a third alternative embodiment with the housing of the slide-out mechanism.

DETAILED DESCRIPTION OF THE PREFERRED EMBODIMENTS

Figure 1:
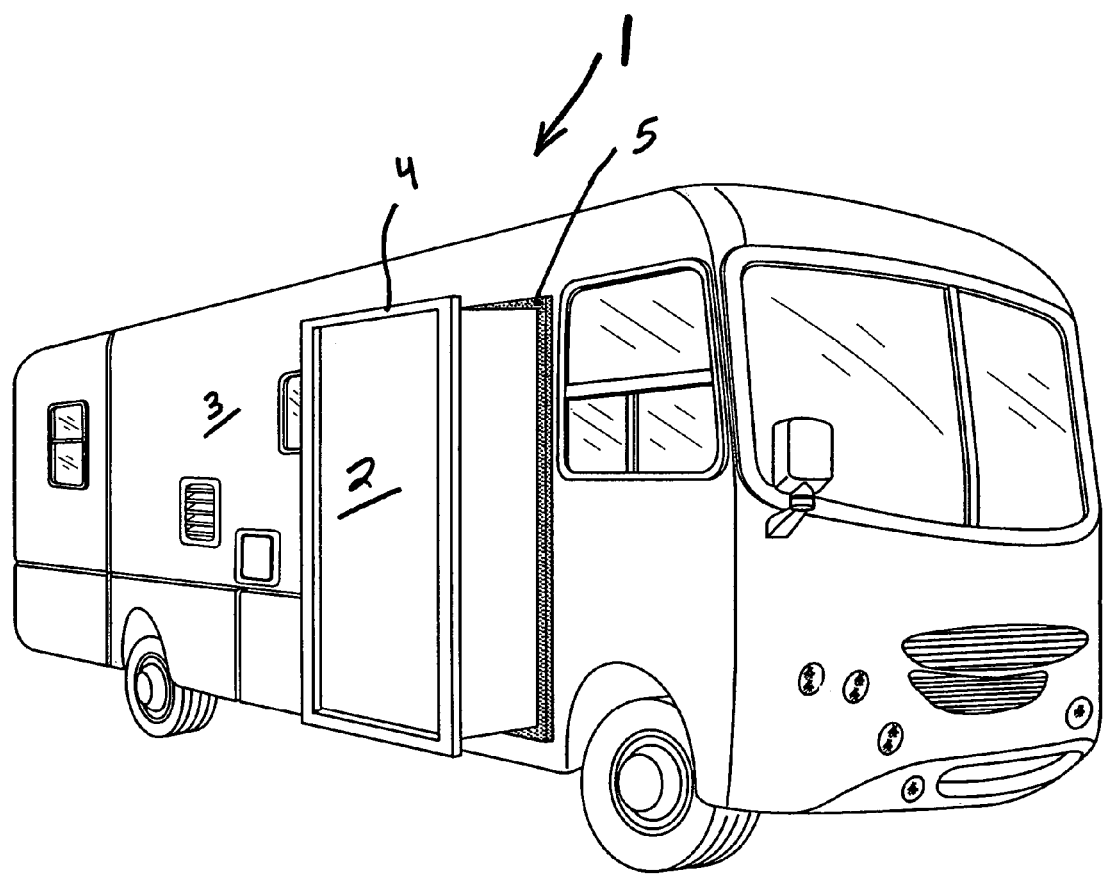
FIG. 1 is a perspective view of an RV with a slide-out section according to an embodiment of the present invention.

FIG. 1 is a perspective view of an exemplary recreational vehicle (RV) 1. FIG. 1 illustrates a motor home RV 1; however, it will be understood that the present invention is not limited to motor home RVs but rather it can be incorporated into other types of RVs, such as a fifth wheel type RV.

In most, if not all, RVs, one or more slide-out sections 2 can be provided which provide an increased amount of interior space when extended. For example, the exemplary motor home RV 1 of FIG. 1 has at least one slide-out section 2 which is controllably movable from a retracted position (FIG. 2) to an extended position (shown in FIG. 1) for the purpose of increasing the available interior space of the RV 1. By actuating a slide-out mechanism (not shown), one or more sections of an exterior wall 3 of the RV 1 can be extended away from the surrounding exterior wall. In order to provide a seal against the elements in both the retracted and extended positions, a skirt 4 can be provided around the exterior wall section 3 and a seal element 5 can be provided around the opening formed in the surrounding exterior wall that permits the extension and retraction of the slide-out section 2. When the slide-out section 2 is retracted, the skirt 4 preferably is in intimate contact with the seal element 5 to effectively seal the interior of the RV 1. The seal element 5 can be formed of any number of conventional sealing materials, such as a suitable insulation, etc. In addition, another seal element (not shown) can be provided on an underside of the skirt 3.

As shown in FIGS. 1-8, the slide-out mechanism functions as a mechanical drive mechanism for causing the controlled extension and retraction of the slide-out section 2 relative to a chassis (not shown) of the RV 1. The slide-out mechanism includes a frame or chassis 7; a plurality of slide-out members 10 supported by or attached to the frame 7, wherein at least one of the slide-out members 10 is a drive member, while the others can be described as being driven or passive members; and a drive mechanism 9 coupled to the slide-out drive member 10. The drive member 10 is connected to the other slide-out members 10 so that the slide-out members 10 can be driven synchronously. The drive mechanism 9 either drives the drive slide-out member in a first direction for extending the slide-out members 10 outwardly from the frame, thereby resulting in the slide-out section 2 being driven to an extended position, or drives the drive slide-out member in a second direction for retracting the slide-out members 10 toward the frame, thereby resulting in the slide-out section 2 being driven to a retracted position.

FIGS. 2-8 illustrate one exemplary slide-out member 10 incorporated into the slide-out mechanism for moving the slide-out section 2 of FIG. 1 between the extended and retracted positions. The slide-out member 10 is aligned such that its length in the longitudinal direction is parallel to the direction of expansion or retraction of the slide-out section 2.

The slide-out member 10 of the present invention can be incorporated into various types of slide-out mechanisms as a drive slide-out member. The slide-out mechanism can have one, two, three, or more slide-out members 10. Furthermore, each of the slide-out members 10 in the slide-out mechanism can alternatively be connected to an individual drive mechanism instead of being a series of active and passive drive members. The individual drive mechanisms can be synchronized to drive each slide-out member to extend or retract at the same time and at the same rate as the other slide-out members to ensure all of the slide-out members are uniformly driven. Furthermore, the drive mechanism 7 can be an electric motor or can include a hydraulic cylinder or any other type of drive mechanism that can move the slide-out section 2 in a controlled manner.

The slide-out member 10 is preferably incorporated into the chassis 7 (FIG. 3) of the RV 1 within the floor of the RV 1. Alternatively, the slide-out member 10 can also be placed above the floor of the RV 1. The slide-out member 10 can be included at the top surface of the slide-out section 2 or at the bottom surface of the slide-out section 2 or as a combination thereof. Due to its flush fit feature described in detail below, the slide-out member 10 is preferably mounted to an underside of the floor or chassis 7 of the RV 1.

Each slide-out member 10 has a first end 11 that is securely coupled to the slide-out section 2 and a second end 12 that is disposed within the RV 1. The slide-out member 10 includes an outer housing 20 (FIG. 7) that is mounted to the chassis of the RV 1 or to the frame of the slide-out mechanism so that the outer housing 20 is stationary with respect to the RV 1; an inner driven member or carrier 60 (FIG. 8) that is slidably contained within the outer housing 20; and a gear mechanism 40 for driving the inner driven member 60 relative to the outer housing 20 so that the slide-out member 10 extends or retracts in the first or the second direction. A gear rack 80 is coupled to and embedded into the inner driven member 60 and engages with a gear 42 in the gear mechanism 40, which is driven to extend or retract the slide-out member 10.

FIG. 7 is a perspective view of the outer housing 20 of the slide-out member 10. The outer housing 20 has a first end 21 that is closer to the exterior wall of the RV 1 and a second end 22 that is disposed within the RV 1. The outer housing 20 is stationary with respect to the RV 1 since it is securely mounted to a support structure, such as a floor 7 (frame/chassis).

The inner driven member 60 slides through a body 23 (tubular structure) that forms a part of the outer housing 20 and the sliding action of the inner driven member 60 within body 23 is the means by which the slide-out section 2 is moved between an extended position and a retracted position. The tubular body 23 has a top surface 24 which supports the underside surface of the slide-out section 2 when the slide-out member 10 is incorporated below the slide-out section 2. In other words, the outer housing 20 is generally an elongated member that is substantially tubular in nature and accordingly, a longitudinal channel is formed from one end to the other end. The channel is defined by an upper wall that defines top surface 24, a floor and two side walls and is sized to receive the inner driven member 60 such that the inner driven member 60 slides along the floor of the outer housing. As illustrated, the upper wall of the body 23 does not extend from one end to the other end as the floor does but rather it terminates at a location prior to the end of the housing 20.

Since the body 23 is a hollow tubular member, it will be appreciated that the inner driven member 60 is substantially surrounded by the housing 20 and therefore, the stationary housing 20 is the component of the member 10 that can be securely mounted flush against a support surface, while, still permitting the inner driven member 60 to freely slide in and out of the housing 20.

Support brackets 30 extend outwardly from sides of the body 23, and each support bracket 30 includes a mounting slot 31 for securing the outer housing 20 to the chassis of the RV 1 or the frame of the slide-out mechanism. For example, the support brackets 30 are preferably integrally connected to the body 23 and in the illustrated embodiment, each support bracket 30 has a rectangular shape. One exemplary shape for the mounting slot 31 is an oval shape that permits some degree of movement of the fastener within the slot 31 to permit variable positioning of the slide-out member 10.

As shown in FIGS. 2-7, bushings are provided in holes 32 at the first end 21 of the outer member 20 for supporting the gear mechanism 40 which drives the inner member 60 such that it can slide within the outer housing 20.

A pair of wear tabs 34 is disposed on the inside surface of the first end 21 of the outer housing 20. The wear tabs 34 facilitate movement of the inner driven member 60 inside the outer housing 20. The wear tabs 34 also protect the inside surface of the outer member 20 and the outside surface of the inner driven member 60 against damage, such as by scratching or abrasion, to the opposing surfaces of the outer housing 20 and the inner driven member 60 of the slide-out member 10.

A stop block 36 is disposed on an inner side surface or below the floor near the first end 21 of the outer housing 20 under the inner driven member 60. A slot 91 is formed in the floor of the outer housing 20 to accommodate a stop block 69 that is associated with inner driven member 60, as described below.

When the slide-out member 10 is incorporated into the floor 7 of the RV 1, the support brackets 30 of the outer member 20 are fastened via fasteners (not shown) to the chassis or floor of the RV 1 or to some other frame member, and the floor of the RV 1 is disposed around and/or above the support brackets 30, either planar or flush with the top surface 24 of the body section 23 of the outer housing 20. A floor portion (not shown) of the slide-out section 2 overlies the floor of the RV 1 and the top surface 24 of the outer housing 20 when the slide-out section 2 is in the retracted position. This can be described as a "a floor over a floor" arrangement.

FIGS. 4-7 illustrate the gear mechanism 40 of the slide-out member 10. The gear mechanism 40 includes the gear 42 that is coupled to and associated with a shaft 44. The shaft 44 is rotatably supported by the bushings which are disposed in the holes 32 at the first end 21 of the outer housing 20. Teeth 43 are formed as part of the gear 42. As shown in FIG. 4, the shaft 44 is either coupled to a cross shaft 39 that is couples one shaft 44 of one slide-out member 10 to another shaft 44 of an adjacent slide-out member 10 or to one shaft 39 that is directly and operatively connected to a drive mechanism 9, such as a motor. As shown in FIG. 4, the slide-out section 10 typically includes a number of slide-out members 10 which can be either independently driven by one drive mechanism 9 or the slide-out members 10 can be interconnected as shown in FIG. 4 to permit one drive mechanism 9 to drive, in unison, all of the slide-out members 10.

The inner driven member 60 has a first end 61 and a second end 62. When the inner driven member 60 is fully retracted inside the outer housing 20, the first end 61 of the inner driven member 60 is housed inside the first end 21 of the outer housing 20 and the second end 62 of the inner driven member 60 is housed inside the second end 22 of the outer housing 20. The first end 61 of the inner driven member 60 is extended outward from the outer housing 20 when the drive mechanism drives the gear mechanism 40 to extend the inner driven member 60.

FIG. 8 illustrates a body section (e.g., tubular body) 63 of the inner driven member 60 of the slide-out member 10. The body 63 includes a top section 65 and a floor section 67. The inner driven member 60 is also an elongated member with the body 63 being a substantially hollow body with a channel or an interior compartment being formed therein for receiving the inner driven member 60.

The body 63 of the inner driven member 60 has a top section 65 that includes a top wall or surface 64 with slots 68 being formed therein and spaced apart at regular intervals along the center of the top surface 64 and the floor 67 including a bottom wall or surface 66 that includes a central slot 79 along the center of the bottom surface 66. The body 63 includes a pair of side walls that extend between the top section 65 and the bottom section 67 so as to create the hollow nature of the body 63. In the illustrated embodiment, the body 63 has a rectangular shape both in cross-section and in side and plan views. The central slot 79 is an elongated slot having a predetermined shape, e.g., oval, and is large enough to receive and hold the gear rack 80 in place therein. The slots 68 are provided on the top surface 64 of the body 63 and shaped cuts (e.g., scalloped shaped) 71 are provided at select location along side edges of the central slot 79 to allow a welding instrument, such as a welding wire, to access the inside of the body 63 for welding the gear rack 80 in place inside the central slot 79 of the body 63 of the inner driven member 60. In other words, the gear rack 80 is received within the central slot 79 and can be initially held therein in a frictional manner before the gear rack 80 is more securely attached to the body 63.

When the gear rack 80 is received in the interior compartment or channel formed in the inner driven member 60, the gear rack 80 is disposed between the top wall 64 and the bottom wall 66 and more specifically, the top of the gear rack 80 lies close to the top wall 64 when it is properly inserted. The shaped cuts 71 represent enlarged sections of the central slot 79 that are formed at select locations to permit an individual to insert a tool therethrough to gain access to an interface between the lower section of the gear rack 80 and the bottom wall or floor 67 of the body 63 for securely attaching these interfacing members by conventional techniques, such as welding.

FIG. 5A is a side view of the gear rack 80 embedded in the inner driven member 60 of the slide-out member 10. The gear rack 80 has a width and a length that is approximately the same as, or slightly smaller than, the length and the width of the central slot 79 on the bottom surface 66 of the inner driven member 60. Thus, the gear rack 80 can be inserted into and held in place by the central slot 79 in the inner driven member 60.

The gear rack 80 has teeth 81 on a bottom surface thereon, and includes a top surface 82, and side surfaces 83 that oppose the side surfaces of the central slot 79 in the inner driven member 60. The teeth 81 of the gear rack 80 complement and mesh with the teeth 43 of the gear mechanism 40 to permit the inner driven member 60 in and out within the outer housing 20. The top surface 82 and the side surfaces 83 of the gear rack 80 is welded to the inside surface of the tube 63 of the inner member 60 by inserting a welding wire through the slots 65 in the top surface 64 of the tube 63 of the inner member 60 and through the scalloped cuts 68 of the bottom surface 66 of the tube 63 of the inner member 60, as described above.

The gear rack 80 is embedded far enough into the body 63 of the inner driven member 60 so that the tips of the teeth 81 in the gear rack 80 are aligned flush with the bottom surface 66 of the body 63. In other words, the bottommost surface of the inner driven member 60 is the underside face of the bottom wall 67 since the teeth 81 do not extend beyond the underside face and therefore the bottom wall 67 lies flush on the bottom wall of the outer housing 20. The tips of the teeth 81 can thus lie in the same plane as the underside face of the bottom wall 66 or they can be slightly recessed or spaced inwardly therefrom.

The gear rack 80 illustrated in FIGS. 8 is formed with a rectangular cross-section. However, it is to be understood that the gear rack 80 can be formed with a cross section in an inverted T-shape, for example, to minimize the weight of the gear rack 80, thereby minimizing the weight of the inner driven member 60.

A stop block 69 is mounted to the bottom surface 66 of the tube 63 near the second end 62 of the inner driven member 60. The stop block 69 limits the distance that the inner member 60 can slide outward from the outer housing 20. As the inner driven member 60 slides extends outward from the outer housing 20, the stop block 36 in the outer housing 20 remains low enough so that it does not interfere with the sliding motion of the inner driven member 60 until the stop block 36 in the outer housing 20 contacts the stop block 69 in the inner driven member 60. The slot 91 is a longitudinal slot formed in the floor of the outer housing 20 that receives the stop block 69 and permits the stop block 69 to move longitudinally as the inner driven member 60 is driven longitudinally. As shown in FIG. 8, the stop block 69 protrudes downwardly from the top section 65 and is arranged next to and passes by the floor section 67 so that when the driven member 60 is assembled, the stop block 69 extends below the floor 66 of the member 60 and therefore represents the bottommost section of the driven member 60. In order for the driven member 60 to be able to be driven along the floor of the outer housing 20, the stop block 69 must be accommodated. The slot 91 accomplishes this and provides a guide channel for the stop block 69. When the stop block 69 extends through the slot 91 it lies below the floor of the outer housing 20 and the longitudinal slot 91 is axially aligned with the stop block 36 so that as the driven member 60 is advanced within the tube 23 of the outer housing 20 and extended outwardly from the vehicle, the stop block 69 is driven towards the stop block 36. A stop condition occurs when and if the two stop blocks 69, 36 make contact, thereby preventing the inner driven member 60 being further extended relative to the housing 20 and the vehicle.

Arms 70 for supporting a pair of rollers 71 extend from side surfaces of the body 63 at the second end 62 of the inner driven member 60. The rollers 71 are rotatably fixed on a roller shaft 72, which is inserted into holes 73 in the arms 70. A pair of wear tabs 74 are disposed on surfaces of the arms 70 that oppose the inside surface of the outer member 20. The wear tabs 74 facilitate movement of the inner driven member 60 inside the outer housing 20, and the wear tabs 74 also protect the opposing surfaces against damage, such as by scratching or abrasion, similarly to the wear tabs 34 on the outer housing 20, as described above.

When the slide-out section 2 is in the retracted position, the second end 62 of the inner driven member 60 is supported by the rollers 71 within the outer housing 20. When the slide-out section 2 moves from the retracted position to the extended position, the rollers 71 allow the inner driven member 60 to maintain a level, horizontal condition when it slides outward within the outer member 20. When the slide-out section 2 is in the extended position, the inner driven member 60 has extended far enough within the outer housing 20 such that the stop block 36 on the outer housing 20 contacts the stop block 69 on the inner driven member 60.

An end plate 75 is connected to the body 63 at the first end 61 of the inner driven member 60. The end plate 75 includes mounting slots 76 for mounting the end plate 75 to the exterior wall 3 and/or the skirt 4 of the slide-out section 2. Since the housing 20 and the inner driven member 60 are disposed below the slide-out section 2, the end plate 75 extends upwardly beyond these two members so as to permit contact with a portion of the slide-out section 2 and more particularly, permits attachment to an inner edge of the floor or end wall of the slide-out section 2. The end plate 75 is the means for the attaching the slide-out section 2 to the slide-out mechanism and thus, provides the mechanism for driving the slide-out section 2 from the retracted position to the extended position.

The operation of the slide-out member 10 will now be described with the slide-out member 10 starting in the retracted position and incorporated into the floor portion of the slide-out section 2.

When the gear mechanism 40 is rotated in the counter-clockwise direction, the drive shaft 44 and the gear 42 are rotated together in the counter-clockwise direction. The teeth 43 in the gear 42 drivingly engage the teeth 81 in the gear rack 80 to drive the inner driven member 60 outward from within the outer housing 20. The end plate 75, which is attached to the exterior wall 3 of the slide-out section 2, is pushed outward to extend the slide-out section 2 to the extended position.

In the retracted position, the floor portion 11 of the slide-out section 2 is supported on the top surface 24 of the body 23 of the outer housing 20 and on the floor of the RV 1. However, when the slide-out member 10 moves toward the extended position, the inner driven member 60 slides out from within the outer housing 20 so that an outer portion of the floor portion of the slide-out section 2 is supported by the top surface 64 of the body 63 of the inner driven member 60.

When the gear mechanism 40 is rotated in the clockwise direction, the drive shaft 44 and the gear 42 are rotated together in the clockwise direction. The teeth 43 in the gear 42 drivingly engage the teeth 81 in the gear rack 80 to drive the inner driven member 60 back into the body section of the outer housing 20. The end plate 75 is pulled back toward the interior of the RV 1 to retract the slide-out section 2 to the retracted position.

The floor portion of the slide-out section 2 is also retracted back so that it is supported by the top surface 24 of the body 23 of the outer housing 20 and by the floor of the RV 1.

The advantages of the slide-out member 10 will now be described. As described above, the gear rack 80 is embedded far enough into the body 63 of the inner driven member 60 so that the tips of the teeth 81 in the gear rack 80 are aligned flush with the bottom surface 66 of the body 63. Since the tips of the teeth 81 in the gear rack 80 are flush with the bottom surface 66 of the body 63, the slide-out member 10 provides a low profile, thereby eliminating any extra height that would cause clearance problems for the slide-out member 10. Thus, since the inner driven member 60 is formed of a slim tubular body section 63, i.e., the height dimension between the top surface 64 and the bottom surface 66 is minimal, the bottom surface 66 of the body section 63 can be mounted close to an underside surface or a topmost surface of the slide-out section 2, thereby creating a low profile for the slide-out member 10.

FIG. 9 illustrates yet another embodiment of an inner driven member 100 and a complementary gear mechanism 150. The inner driven member 100 is similar to the inner driven member 60 and is therefore constructed to be received within the body 23 of the outer housing 20 and to be directly coupled to the slide-out section 2 so that operation and extension/retraction of the inner driven member 100 is directly translated into extension and retraction, respectively, of the inner driven member 100. The inner driven member 100 includes a first body member 102, a second body member 104 spaced from the first body member 102 and a gear rack 110 disposed between the first and second body members 102, 104. Preferably, the three members 102, 104, 110 are securely attached to one another, using traditional means, so as to form a single unitary structure.

More specifically and according to one exemplary embodiment, the first and second body members 102, 104 are elongated structures and the gear rack 110 is identical to or similar to the gear rack 80 illustrated in FIG. 8. For example, each of the first and second body members 102, 104 can be in the form of an elongated tubular structure that are disposed side-by-side with an elongated space or slot formed therebetween for receiving the gear rack 110; however, the body members 102, 104 can equally be solid members as opposed to being tubes. The gear rack 110 includes upper surface 112 that is preferably planar in nature, with a bottom surface containing a number of teeth 114 that are complementary to and configured to mesh with the gear mechanism 150. The gear rack 110 is disposed between the body members 102, 104 and similar to the first embodiment, the teeth 114 lie in the same plane or lie in a plane slightly above a plane that contains the surrounding bottom surfaces of the first and second body members 102, 104. Thus, the teeth 114 do not impede the smooth travel of the driven inner member 100 within the housing 20 and in particular, along the bottom surface of the body 23. The teeth 42 of the gear 40 mesh with teeth 114.

The gear rack 110 can be coupled or attached to the two body members 102, 104 using traditional means. For example, the gear rack 110 can be attached to body members 102, 104 using an adhesive or it can be bonded to the body members 102, 104 by a welding process or the like, or by a mechanical fit, etc. In one embodiment, the body members 102, 104 and the gear rack 110 can be attached by welding the components together as shown in FIG. 9. FIG. 10 shows an alternative embodiment where the body members 102, 104 and the gear rack 110 are attached by a weld(s) in combination with one or more pins 170 that pass through the members, thereby securely attaching all of the members together to ensure that they are driven as a single structure within the body 23.

In this embodiment, a pair of rollers is associated instead with the gear mechanism 150. More specifically, the gear mechanism 150 is similar to the gear mechanism 40 with the exception that a pair of rollers 160 is provided as part thereof to contact an underside (bottom surface) of the first and second body members 102, 104. The rollers 160 are spaced from one another and are disposed at positions so that when the gear mechanism 150 meshes with the teeth 114 of the gear rack 110, the two rollers 160 are aligned with and in contact with the underside of the two body members 102, 104.

The illustrated gear mechanism 150 includes the drive shaft 44 and the gear 42 that is coupled to and associated with the shaft 44. The drive shaft 44 is rotatably supported by the bushings which are disposed in the holes 32 at the first end 21 of the outer housing 20. The gear 42 includes a plurality of teeth 43 that are complementary to and designed to meshingly mate with the teeth 114 of the gear rack 110. The gear 42 is located between the two rollers 160 and in the proper position such that when the body members 102, 104 rest on the rollers 160, the teeth 114 of the gear track 110 mesh with the teeth 43 of the gear 42, thereby permitting the driven member 100 to be driven within the housing 23.

Having described embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A slide-out member for controllably moving a slide-out section that is associated with a vehicle, the slide-out member comprising:
    an inner driven member having a top wall and a bottom wall and a pair of side walls extending therebetween, the bottom wall extending between and being coupled at its ends to the side walls, and a gear component disposed between the top and bottom walls, the gear component including teeth, the bottom wall having a slot through which the teeth are accessible, the slot being defined by sections of the bottom wall that extend inward from the side walls, the teeth being provided along the bottom wall such that the teeth lie in a same plane or in a plane above a plane that contains portions of the bottom wall that surround the slot;
    a gear mechanism that drivingly engages the teeth of the inner driven member by being disposed adjacent bottom wall so that the gear mechanism meshes with the teeth through the slot formed in the bottom wall; and
    an outer housing defines a channel for receiving at least a gear portion of the gear mechanism and the inner driven member such that the gear mechanism engages the teeth in the inner member to controllably drive the inner member relative to the outer housing resulting in the slide-out section being moved between an extended position and a retracted position, the outer housing including a top wall for attachment to a fixed wall of the vehicle and a floor on which the inner driven member is driven.

2. The slide-out member of claim 1, wherein the housing includes one or more support brackets that are integral thereto and extend outwardly therefrom for attaching the slide-out member to a chassis or frame associated with the vehicle.

3. The slide-out member of claim 1, wherein the channel is substantially enclosed by the top wall and the opposite floor, with the inner driven member being received between the top wall and the floor and includes means for traveling along the floor of the housing.

4. The slide-out member of claim 3, wherein the means comprises one or more rollers that are part of and are disposed at one end of the inner driven member to permit the inner driven member to be rollingly driven across the floor under operation of the gear mechanism.

5. The slide-out member of claim 4, wherein when the teeth of the inner driven member mesh with the gear mechanism and the rollers are supported by the floor, the inner driven member assumes a substantially level position relative to the floor of the outer housing.

6. The slide-out member of claim 1, wherein the inner driven member includes an end bracket for attachment to the slide-out section so as to securely attach the inner driven member to the slide-out section.

7. The slide-out member of claim 1, wherein the gear mechanism includes a gear having teeth that are complementary to and meshingly engage the teeth of the inner driven member to operatively and drivingly connects the gear mechanism to the inner driven member.

8. The slide-out member of claim 7, wherein the gear mechanism includes a drive shaft that supports the gear and is operatively coupled to a drive source such that actuation of the drive source results in rotation of the drive shaft and the gear.

9. The slide-out member of claim 8, wherein the drive shaft extends across the channel and is supported by vertical walls of the outer housing, with at least a portion of the drive shaft extending outwardly from the outer housing and the gear being disposed above the floor of the outer housing and between the vertical walls of the housing but in position where the inner driven member can travel thereover.

10. The slide-out member of claim 7, wherein the inner driven member is disposed above the gear within the outer housing, the outer housing limiting the vertical and lateral movement of the inner driven member such that a topmost surface of the outer surface comprises a topmost surface of the slide-out member and is adapted to be mounted to an underside of a support member associated with the vehicle.

11. A slide-out member for controllably moving a slide-out section that is associated with a vehicle, the slide-out member comprising:
    an inner driven member having teeth provided along a first face thereof such that the teeth lie in a same plane or in a plane above a surrounding surface of the first face of the inner driven member;
    a gear mechanism that drivingly engages the teeth of the inner driven member; and
    an outer housing defines a channel for receiving at least a gear portion of the gear mechanism and the inner driven member such that the gear mechanism engages the teeth in the inner member to controllably drive the inner member relative to the outer housing resulting in the slide-out section being moved between an extended position and a retracted position, wherein the first face is a bottom surface of the inner driven member, the first face having a slot formed therein for receiving a gear rack that contains the teeth, with the gear rack being securely held in an interior space in the inner driven member such that the teeth lie in the same plane or in a plane above the surrounding surface of the first face, wherein the slot includes one or more enlarged sections that extend off of a central elongated portion of the slot to permit an object to be inserted along one or more side edge of the gear rack.

12. A slide-out member for controllably moving a slide-out section that is associated with a vehicle, the slide-out member comprising:
    an inner driven member having teeth provided along a first face thereof such that the teeth lie in a same plane or in a plane above a surrounding surface of the first face of the inner driven member;
    a gear mechanism that drivingly engages the teeth of the inner driven member;
    an outer housing defines a channel for receiving at least a gear portion of the gear mechanism and the inner driven member such that the gear mechanism engages the teeth in the inner member to controllably drive the inner member relative to the outer housing resulting in the slide-out section being moved between an extended position and a retracted position; and a first stop associated with the inner driven member and a second stop associated with the outer housing, wherein the first and second stops serve to limit the degree of travel of the inner driven member with respect to the outer housing.

13. The slide-out member of claim 12, wherein the first and second stops limit the degree of extension of the inner driven member such that when the first and second stops contact one another, the inner driven member has reached the fully extended position.

14. The slide-out member of claim 12, wherein the first stop is a block disposed on an underside of the inner driven member and the second stop is a block disposed on a floor of the outer housing which supports the inner driven member.

15. A slide-out member for controllably moving a slide-out section that is associated with a vehicle, the slide-out member comprising:
    an inner driven member having a bottom face that includes a gear rack that includes teeth that lie in a same plane or in a plane above a surrounding surface of the bottom face of the inner driven member, the inner driven member having a means for attachment to the slide-out section;
    a gear mechanism including a gear that engages the teeth of the inner driven member; and
    an outer housing having an interior compartment for receiving the gear mechanism and the inner driven member that is controllably driven linearly along a floor of the outer housing, with the gear being disposed between the inner driven member and the floor such that the gear faces the bottom face and engages the teeth of the inner driven member to controllably drive the inner member relative to the outer housing resulting in the slide-out section being moved between an extended position and a retracted position.

16. The slide-out member of claim 15, wherein the inner driven member comprises a first elongated body and a second elongated body with the gear track being disposed between and securely attached to the first and second elongated bodies.

17. The slide-out member of claim 16, wherein the gear track is attached to the first and second elongated bodies by welds and by one or more pins extending thereacross to securely couple the gear track to the first and second elongated bodies.

18. The slide-out member of claim 16, wherein each of the first and second elongated bodies comprises an elongated tube.

19. The slide-out member of claim 16, wherein a bottom surface of each of the first and second elongated bodies comprises a lowermost surface of the inner driven member.

20. A slide-out member for controllably moving a slide-out section that is associated with a vehicle, the slide-out member comprising:

an outer housing that includes a floor that partially defines a guide channel;

a carrier that supports and is securely coupled to the slide-out section, the carrier including teeth formed on a bottommost surface of the carrier, the carrier being received within the guide channel, a gear mechanism including a gear that engages the teeth of the carrier for controllably driving the carrier along a length of the floor of the outer housing; and wherein at least a portion of the gear is disposed between the carrier and the floor such that the gear faces the bottommost surface and engages the teeth of the carrier to controllably drive the carrier relative to the outer housing resulting in the slide-out section being moved between an extended position and a retracted position.

21. A slide-out mechanism for controllably moving a slide-out section that is associated with a vehicle having a support frame, the slide-out mechanism comprising:

a plurality of slide-out members including at least one actively driven slide-out member and at least one slave slide-out member that is driven by action of the actively driven slide-out member, each slide-out member including:

a carrier having a top face and a bottom face that includes gear teeth that lie in a same plane or in a plane slightly above a surrounding surface of the bottom face of the carrier, the carrier having a means for attachment to the slide-out section;

a gear mechanism including a gear that engages the teeth of the carrier; and an outer housing having an interior compartment for receiving at least the gear and the carrier that is controllably driven linearly along a floor of the outer housing, with the gear being disposed between the inner driven member and the floor such that the gear faces the bottom face and engages the teeth of the inner driven member to controllably drive the inner member relative to the outer housing resulting in the slide-out section being moved between an extended position and a retracted position, wherein the outer housing is constructed for mounting to an underside of the support frame and the carrier freely slides along the floor, the top face of the carrier being substantially contained in the outer housing when the slide-out section is in the retracted position, the outer housing having a ceiling opposite the floor that represents a topmost portion of the slide-out member; and a drive source that is operatively coupled to the at least one actively driven slide-out member, with the slide-out members being coupled to one another such that they are driven uniformly by action of the drive source.

\* \* \* \* \*